United States Patent [19]

Hulsing, II et al.

[11] Patent Number: 5,275,048

[45] Date of Patent: Jan. 4, 1994

[54] ACCELERATION OVERLOAD PROTECTION MECHANISM FOR SENSOR DEVICES

[75] Inventors: Rand H. Hulsing, II, Redmond; Brian L. Norling, Mill Creek; James R. Woodruff, Redmond, all of Wash.

[73] Assignee: Sundstrand Corporation, Rockford, Ill.

[21] Appl. No.: 822,778

[22] Filed: Jan. 21, 1992

[51] Int. Cl.[5] .............................. G01P 15/02
[52] U.S. Cl. .............................. 73/514; 73/526
[58] Field of Search .............................. 73/514, 517

[56] References Cited

U.S. PATENT DOCUMENTS

| | | | |
|---|---|---|---|
| 4,221,131 | 9/1980 | Albert | 73/517 AV |
| 4,236,137 | 11/1980 | Kurtz et al. | 338/5 |
| 4,679,434 | 7/1987 | Stewart | 73/517 R |
| 4,882,933 | 11/1989 | Petersen et al. | 73/517 |
| 4,928,203 | 5/1990 | Swindal et al. | 361/280 |
| 5,008,774 | 4/1991 | Bullis et al. | 73/517 R |
| 5,176,031 | 1/1993 | Peters | 73/517 R |

FOREIGN PATENT DOCUMENTS

| | | | |
|---|---|---|---|
| 4100451 | 7/1991 | Fed. Rep. of Germany | 73/517 R |
| 1561047 | 4/1990 | U.S.S.R. | 73/517 R |

OTHER PUBLICATIONS

Mayer et al., "Fabrication of Non-Underetched Convex Corners in Anisotropic Etching of (100)-Silicon in Aqueous KOH with Respect to Novel Micromechanic Elements", J. Electrochem. Soc., vol. 137, No. 12, Dec. 1990.

Primary Examiner—Hezron E. Williams
Assistant Examiner—Michael Brock
Attorney, Agent, or Firm—McAndrews, Held & Malloy, Ltd.

[57] ABSTRACT

An acceleration overload protection mechanism for use with a sensor unit. The sensor unit is generally defined by a sensor element or elements (i.e., proof mass, flexures, etc.) that are movable in relation to a sensor frame. The overload protection mechanism includes at least one arresting plate. The arresting plate includes a plate frame and an arresting element that are elastically coupled to one another to permit relative movement therebetween. The plate frame of the overload protection mechanism is placed in fixed alignment with the sensor frame to place the arresting element in spaced relation with the sensor element of the sensor unit. The arresting element and sensor element may move relative to one another to allow the arresting element to move to a position proximate the sensor element to limit the range of motion of the sensor element when the sensor unit is subject to an acceleration overload. Projections extend between the arresting element and sensor unit to engage corresponding channels thereby protecting the sensor unit from damage due to cross-axis accelerations.

36 Claims, 8 Drawing Sheets

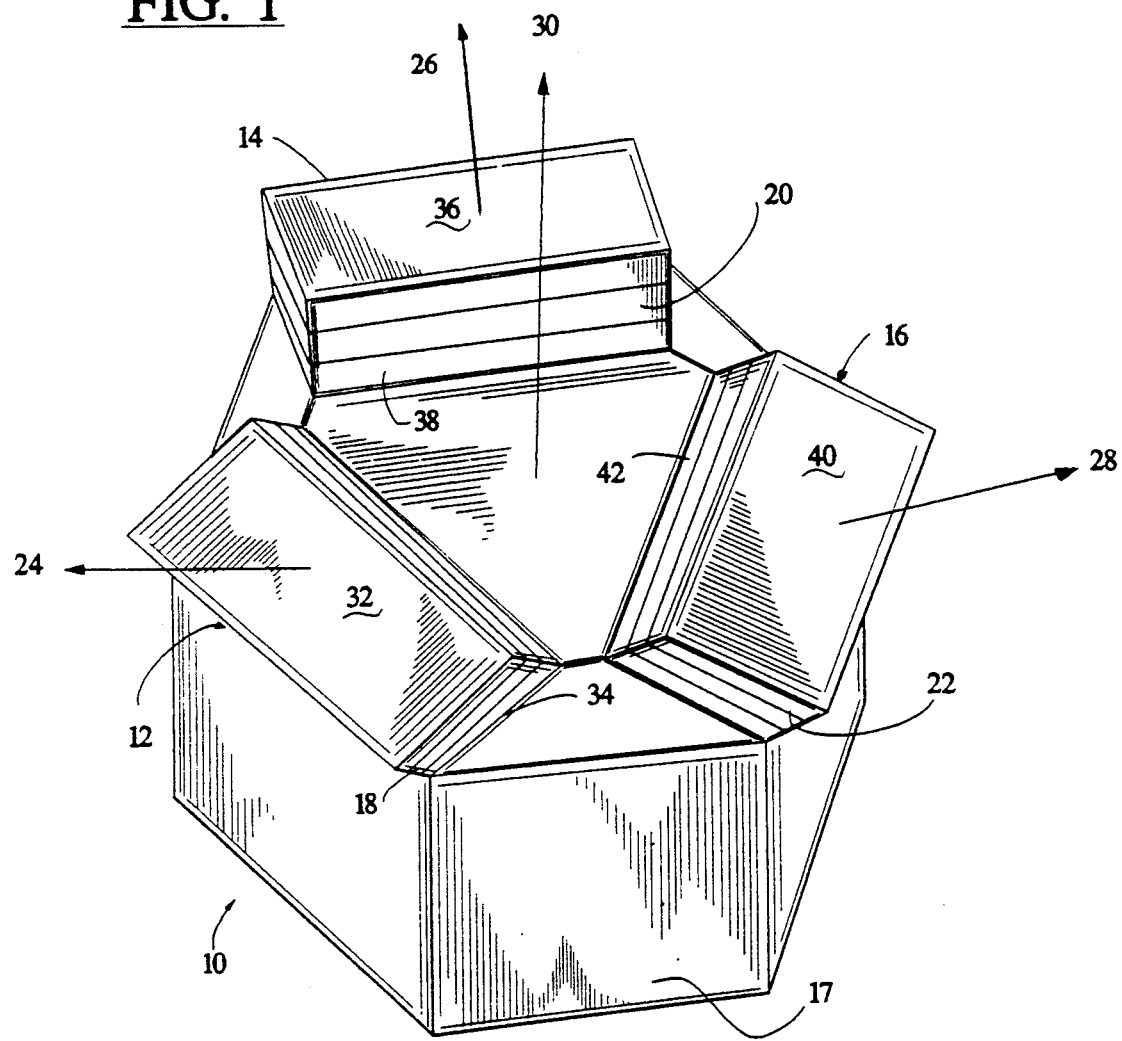

ACCELERATION OVERLOAD PROTECTION MECHANISM FOR SENSOR DEVICES

FIELD OF THE INVENTION

The present invention relates to an overload protection mechanism for a sensor unit. More particularly, the present invention relates to a mechanism which provides acceleration overload protection to an acceleration and angular rate sensor used in an inertial guidance system.

BACKGROUND OF THE INVENTION

The art contains various examples of the construction and operation of inertial measurement units (IMU) for measuring linear acceleration and angular rate. One such IMU is disclosed in U.S. Pat. No. 4,841,773, issued Jun. 27, 1989. The IMU described therein uses a plurality of accelerometer sensor units. Each accelerometer includes a single crystal silicon chip sandwiched between a pair of non-conductive insulative members which may be made from pyrex. The accelerometer includes a proof mass which has been separated from the silicon chip by an etched channel to free the proof mass along at least three of its edges. The fourth edge is provided with a hinge or flexure which may be formed by etching away some, but not all of the edge which joins the proof mass to the silicon chip. Although the patent states that any hinge will do, the embodiment shown in the patent utilizes a cross beam flexure blade hinge.

Sensors used in IMU's must be both sensitive and rugged. For example, in a rocket motor guidance system for a projectile which is fired from a gun, the projectile is accelerated within the gun barrel to an acceleration on the order of 30,000 g's. Immediately after the projectile is expelled from the gun, the projectile undergoes an acceleration in the opposite direction on the same order of magnitude. For these and other applications, it is desirable to provide protection for the sensor device from forces due to such accelerations along the sensitive axis, opposed to the sensitive axis, and in other directions as well. Such protection, however, should not degrade the sensitivity of the sensor device. While attempts have been made to provide stability for sensor devices during normal operation of the device, i.e., with the use of damping plates, none have adequately addressed the problems associated with accelerations that greatly exceed those which the device is designed to withstand. Thus, the prior art sensor designs now offer unsatisfactory performance, particularly upon the receipt of accelerations that greatly exceed the sensitivity range of the sensor.

SUMMARY OF THE INVENTION

The present invention is directed to an acceleration overload protection mechanism for use with a sensor unit. The sensor unit for which the present invention is most applicable is generally defined by at least one surface and has a sensor element or elements (i.e., proof mass, flexures, etc.) that are movable in relation to a sensor frame.

The overload protection mechanism includes at least one arresting plate. The arresting plate includes a plate frame and an arresting element which are elastically coupled to one another to permit relative movement therebetween. The plate frame of the overload protection mechanism is placed in fixed alignment with the sensor frame (e.g., by direct connection of the frames) to place the arresting element in spaced relation with the sensor element of the sensor unit. Since the arresting element is connected to the plate frame by an elastic connection, the arresting element and sensor element may move relative to one another to allow the arresting element to limit the range of motion of the sensor element when the sensor unit is subject to an acceleration overload in a first direction.

One embodiment of the present invention comprises first and second arresting plates which sandwich the sensor unit. The arresting elements of the arresting plates limit the range of motion of the sensor element to protect the sensor unit from acceleration overloads in both a first direction and a second direction opposite the first direction.

Both arresting plates include an arresting element connected with an outer plate frame by an elastic connection structure to permit relative movement therebetween. The outer plate frame of the first arresting plate is secured to the top surface of the sensor frame. The arresting element of the first plate limits the range of motion of the sensor element of the sensing device upon the receipt of an acceleration overload in the first direction.

The outer plate frame of the second arresting plate is secured to the bottom surface of the sensor frame. The arresting element of the second plate limits the range of motion of the sensor element when an acceleration overload is experienced in a second direction opposite the first direction. The arresting elements of both the first and second arresting plates may be secured to a mounting support frame of, for example, an inertial measurement unit. Alternatively, only one arresting plate may be secured to the mounting support frame.

Where both arresting plates are secured to mounting support frames, an acceleration overload in the first direction moves the sensor unit toward the arresting element of the first plate and thereby limits the range of travel of the sensor element relative to the sensor frame. The sensor element may make direct contact with the arresting element so that the sensor element cannot move with respect to the sensor frame. In many instances, the acceleration overload is of a relatively short duration and actual direct contact between the sensor element and the arresting element might not occur. In such instances, the range of motion of the sensor element is nevertheless limited by the damping effect of any backfill gas and the relative movement between the sensor element and arresting element. In either case, the acceleration overload protection mechanism provides protection from acceleration overloads in the first direction. In a similar fashion, an acceleration in the second direction opposite the first direction causes the sensor unit to move toward the second arresting element to limit the range of motion of the sensor element.

The arresting elements may also include projections which extend into channels in the sensor element. In one embodiment, the projections are sufficiently long enough to remain in the channels during normal acceleration inputs. In another embodiment, the projections only extend into the channel when the arresting element is proximate the sensor element under the influence of an acceleration overload. In yet another embodiment, the projections are fixed on a non-movable plate that is fixed relative to the sensor unit. The projections in each instance limit the range of motion of the sensor element in directions normal to the first and second directions to protect against cross-axis acceleration overloads.

BRIEF DESCRIPTION OF THE DRAWINGS

The above described and additional objects and features of the present invention may be further understood by reference to the following detailed description of the preferred embodiments taken in conjunction with the accompanying drawings of which:

FIG. 1 is a perspective view of an inertial rate sensor incorporating a plurality of sensor device assemblies having the acceleration overload protection mechanisms of the present invention;

Figure 2A:
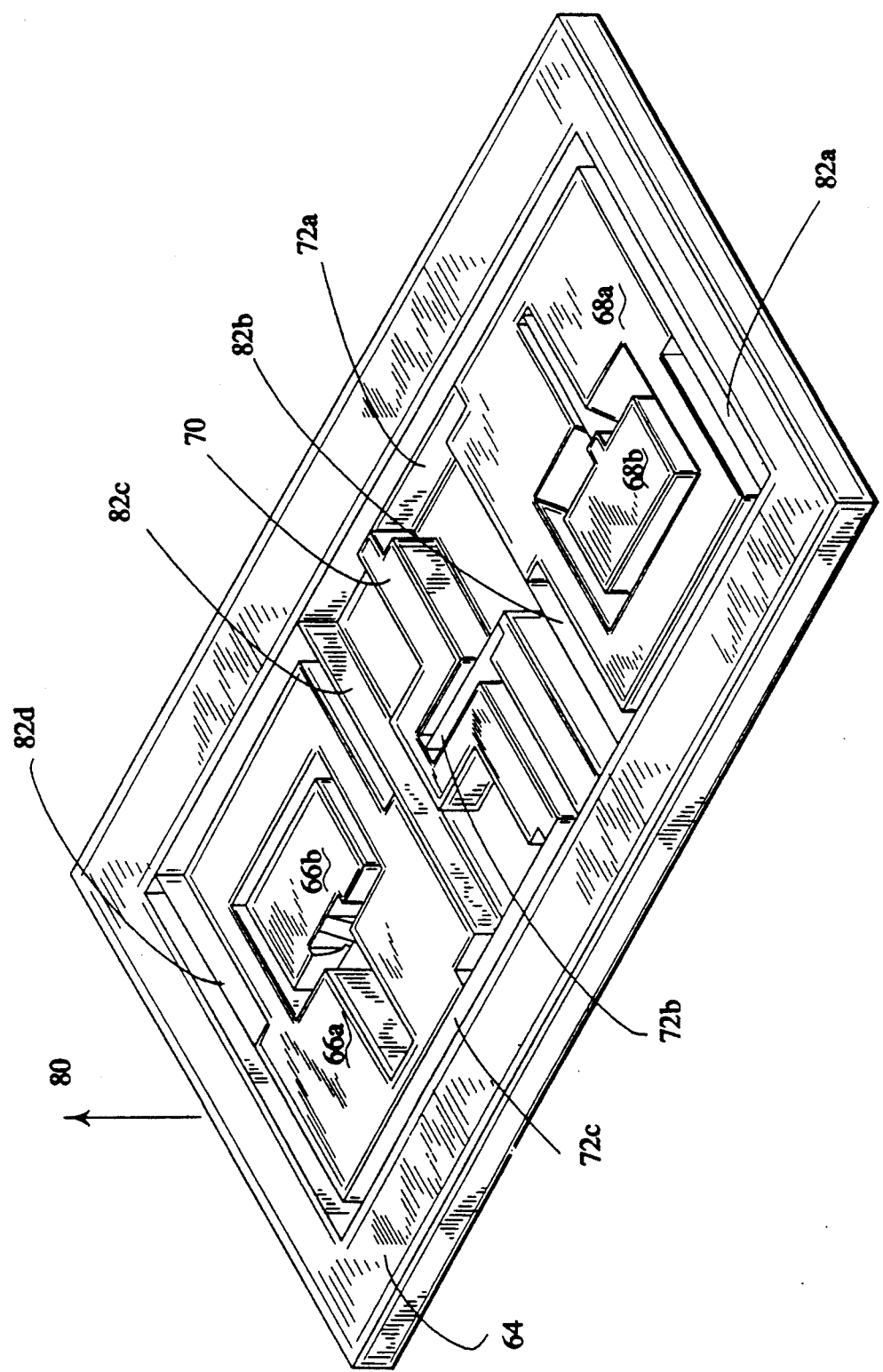
FIG. 2A is a perspective view of a sensor unit which is suitable for use with the present invention.

It will be understood that the drawings are not necessarily to scale. In certain instances, details which are not necessary for understanding the present invention have been omitted for clarity.

DETAILED DESCRIPTION OF THE PREFERRED EMBODIMENTS

FIG. 1 shows a perspective view of an Inertial Measurement Unit ("IMU") 10 which utilizes sensor device assemblies 15 that incorporate acceleration overload protection mechanisms constructed in accordance with the invention. The IMU 10 includes a plurality of sensor device assemblies, shown generally at 15, that are coupled to an approximately hexagonal support frame 20. The IMU 10 further may include a corresponding top support frame that is not shown in FIG. 1.

Each sensor device assembly 15 includes a sensor unit 25 that is bounded by first and second arresting plates 30,32 which form the acceleration overload protection mechanisms according to the present invention. Specifically, each pair of arresting plates 30,32 is arranged in a stacked configuration in relation to the respective sensor unit to sandwich the sensor unit therebetween. As described below, the arresting plates 30,32 include arresting elements which limit the range of motion of sensor elements of the sensor unit upon the receipt of an acceleration overload.

The sensor units 25 are designed to measure both linear acceleration and angular rate. Angular rate is measured through the detection and measurement of coriolis forces. As shown in FIG. 1, the sensor units 25 of the sensor device assemblies 15 include acceleration input axes denoted by arrows 35 that are preferably configured at an angle of 35.26 degrees with respect to the center-line 40 of the IMU 10. Such a configuration provides for efficient computation of acceleration and angular rate along three orthogonal axes. The center-line 40 also defines a central longitudinal axis of the IMU 10.

FIG. 2A shows the general structure of a sensor unit that is capable of measuring both linear acceleration and angular rate. The sensor unit is shown here in only a general fashion and many details have been excluded for the sake of simplicity. However, a more detailed description of such a sensor unit is given in a copending U.S. application entitled, "Micromachined Rate and Acceleration Sensor," Ser. No. 653,533, filed Feb. 8, 1991, which is hereby incorporated by reference.

Generally described, the sensor unit 25 of FIG. 2A is defined by substantially planar top and bottom surfaces and is fabricated from a single silicon wafer. The sensor unit 25 includes a sensor frame 45 that borders a plurality of sensor elements. The sensor elements are arranged to form first and second accelerometers shown generally at 50 and 55. Each accelerometer 50,55 includes a respective accelerometer frame 60,65 and a proof mass 70,75. A lever arm link 80, pivot flexure 81 and flexures 82 interconnect the first and second accelerometers 50 and 55 and are arranged so that any extraneous motion imposed on one of the accelerometers is also imposed on the other one in the opposite direction. Although not shown in the drawings, magnetic circuitry is provided to create a magnetic field in the direction shown by arrow 85 which assists in dithering the accelerometers so that the accelerometers may be used to detect angular rate from coriolis forces.

The accelerometers 50 and 55 are coupled to the sensor frame 45 by a plurality of flexures 90. While the flexures provide a very compliant suspension of the accelerometers and of the linkage member, they tend to exceed their maximum stress or Euler buckling load when the supported components are subject to large acceleration overloads. Accordingly, these flexures tend to fracture upon receipt of such accelerations.

Figure 2B:
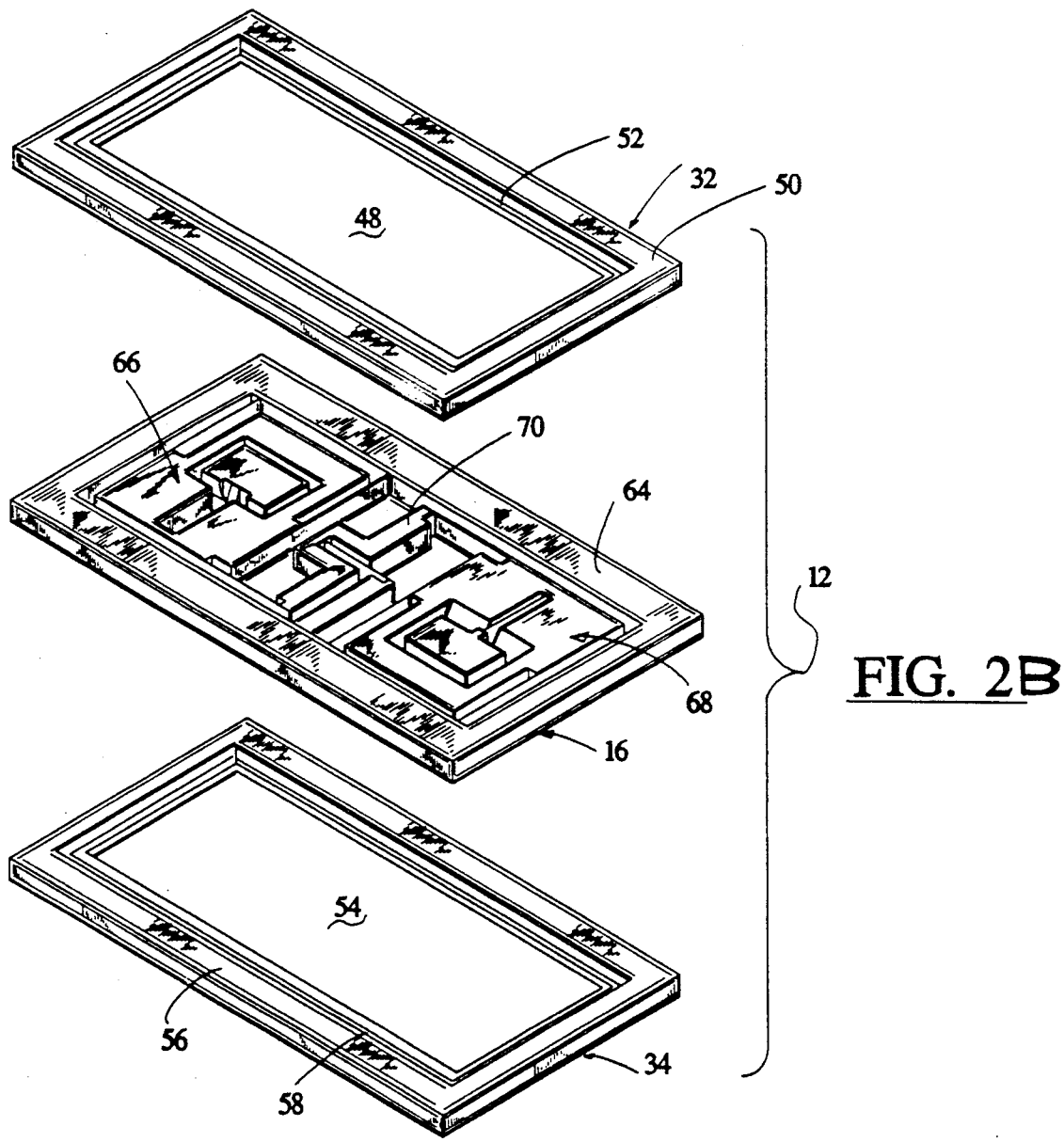
FIG. 2B is an exploded view of a sensor device assembly in accordance with a first embodiment of the present invention.

In as much as the sensor device assemblies each have the same structure and operation, the invention will only be described in conjunction with one such sensor device assembly 15 shown in detail in FIG. 2B. As illustrated, the first arresting plate 30 includes a generally rectangular arresting element 95 surrounded by an outer rectangular plate frame 100. A diaphragm 105 extends along the outer periphery of the arresting element 95 and along the inner periphery of the plate frame 100 to form an elastic connection therebetween which allows relative movement between the arresting element 95 and plate frame 100. Likewise, the second arresting plate 32 includes a generally rectangular arresting element 110 coupled with a surrounding outer plate frame 115 by a diaphragm 120. As with the first arresting plate 30, the diaphragm 120 permits relative movement between the plate frame 115 and arresting element 110.

Referring now to FIG. 3A, there is shown a cross-sectional view of the sensor device assembly 15 of FIGS. 1–2B as it exists when it is fully assembled. As shown, the plate frame 115 of the second arresting plate 32 is secured to the bottom surface of sensor frame 45. Likewise, the bottom surface of the plate frame 100 of the first arresting plate 30 is secured to the top surface of the sensor frame 45.

FIG. 3A also shows the arresting elements 95,110 connected to the top and bottom IMU support frame 125,130. The arresting elements 95,110 may, for example, be bonded to the IMU support frames 125,130 with a suitable epoxy. No such connections between the arresting elements and the support frames 125,130 are mandatory. Other Variations will likewise be recognized by those skilled in the art.

FIG. 3A also illustrates the structure of the diaphragms 105 and 120. As illustrated, the diaphragms are flexures manufactured through anisotropic etching of the plate surfaces to form a plurality of notches in the silicon wafer. Each diaphragm forms a continuous connection between the inner periphery of the plate frame and the outer periphery of the arresting element of the respective arresting plate. This allows the arresting plates to form a hermetic seal about the sensor elements of the sensor unit 25.

An acceleration overload in the first direction shown by arrow 135 moves the sensor unit 25 toward the arresting element of the second plate and thereby limits the range of travel of the accelerometer 50 relative to the sensor frame 45. Elements of the accelerometer 50 may make direct contact with the arresting element 110 so that further movement of the accelerometer 50 is inhibited. In many instances, the acceleration overload is of a relatively short duration and actual direct contact between the accelerometer 50 and the arresting element 110 might not occur. In such instances, the range of motion of the sensor elements forming accelerometer 50 is nevertheless limited by the damping effect of any backfilled gas and the relative movement between the accelerometer 50 and arresting element 110. In either case, the relative arrangement provides protection from overload accelerations in the first direction 135. In a similar fashion, an acceleration in a second direction denoted by arrow 140 causes the sensor unit 25 to move toward the first arresting plate and allows the arresting element 95 to limit the range of motion of the elements of accelerometer 50.

A problem may occur due to contact or close spacing of accelerometers 50,55 and the arresting elements 95,110. In some cases, the accelerometers are surrounded by gas for gas damping or for preventing shock due to collisions between the accelerometers and the arresting elements. Furthermore, if the arresting elements and the accelerometers come into direct contact with one another, gas pressure may hold the parts together so that they do not swiftly separate or fail to come apart altogether. Another problem, particularly in vacuums, is that contacting parts are subject to van der Waals forces which cause the parts to stick together.

To avoid the foregoing problems, small spacing pads 145 may be disposed between the arresting elements 95,110 and the accelerometers 50,55 (only one accelerometer 50 is shown here). Where the accelerometers are made from silicon, the spacing pads are preferably made from gold. This arrangement provides arrest of the accelerometers without the time delay that would otherwise occur while the gas is being driven from between the parts during the last few micrometers of travel and, further, permits gas flow between the parts to facilitate separation. Since van der Waals forces between gold and silicon are known to be minimal, these forces are also minimized. Although the embodiments shown in FIGS. 3A–3D show the pads 145 disposed on the surface of the accelerometer 50, the pads may alternatively be disposed on the arresting elements 95,110, or may be disposed on both the accelerometer 50 and arresting elements 95,110.

Figure 3:
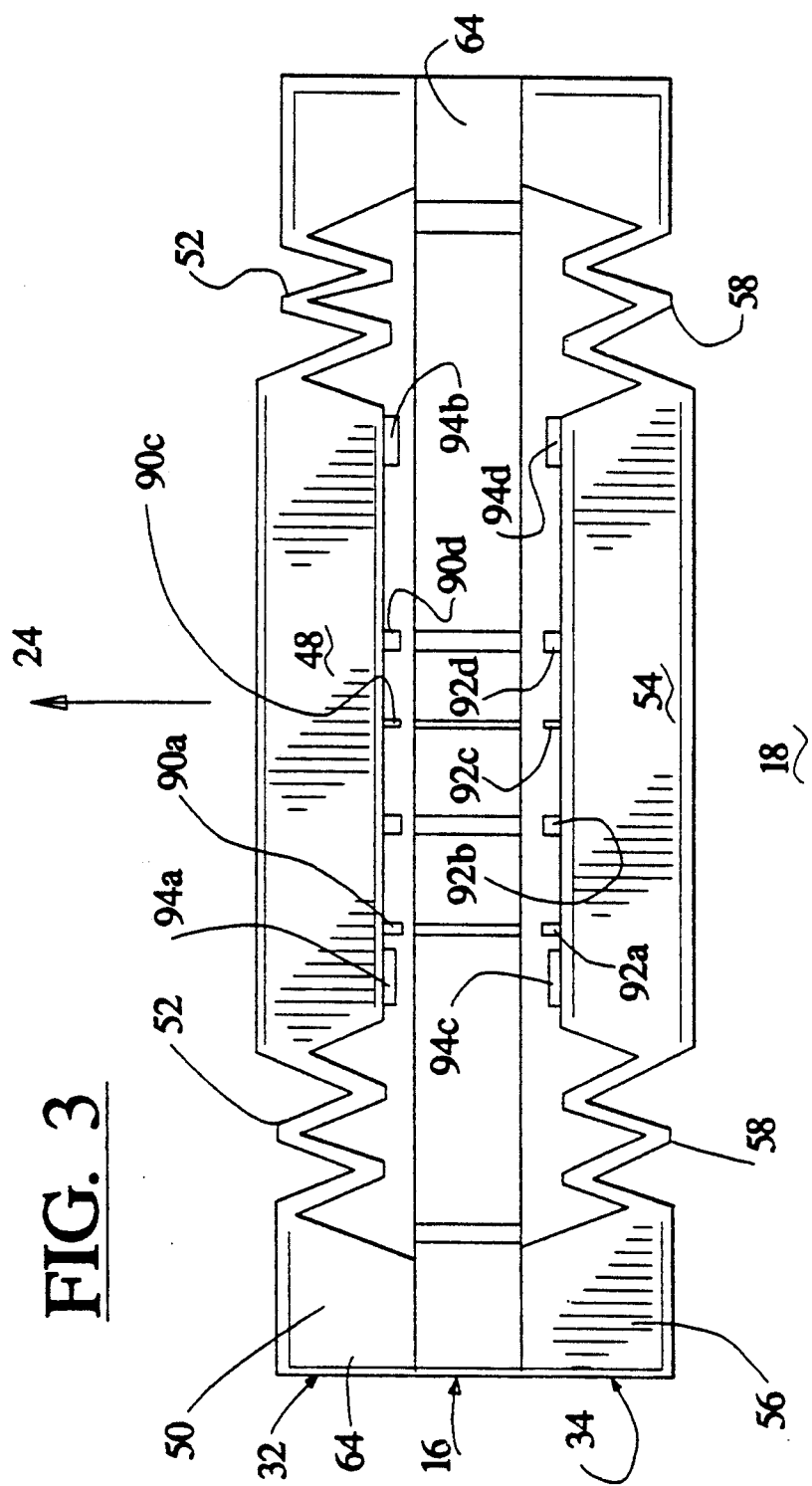
FIG. 3A is a cross sectional view of the sensor device assembly shown in FIG. 2.
FIG. 3B is a cross sectional view of the sensor device assembly shown in FIG. 2 and further having projections extending from the arresting elements which engage channels in the sensor element.
FIG. 3C is a cross sectional view of the sensor device assembly shown in FIG. 2 and further having projections extending from the sensor element which engage channels in the arresting elements.
FIG. 3D is a further modification of the embodiment shown in FIG. 3C wherein the projections are located on the sensor element and the corresponding channels are on damping plates that are in substantially fixed alignment with the sensor unit.

FIG. 3B illustrates a modification to the embodiment of FIGS. 1–3A which includes a plurality of projections 150 formed on the arresting elements 95 and 110. The projections 150 extend into acceptance channels 155 and assist in providing cross-axis acceleration overload protection, that is, acceleration overloads normal to the first and second directions 135 and 140. Alternatively, as shown in FIGS. 3C and 3D, the projections 150 may extend from the components of the accelerometer 50 to engage acceptance channels 155 on the arresting elements 95,110 (FIG. 3C) or damping plates 160,165 (FIG. 3D).

Figure 4:
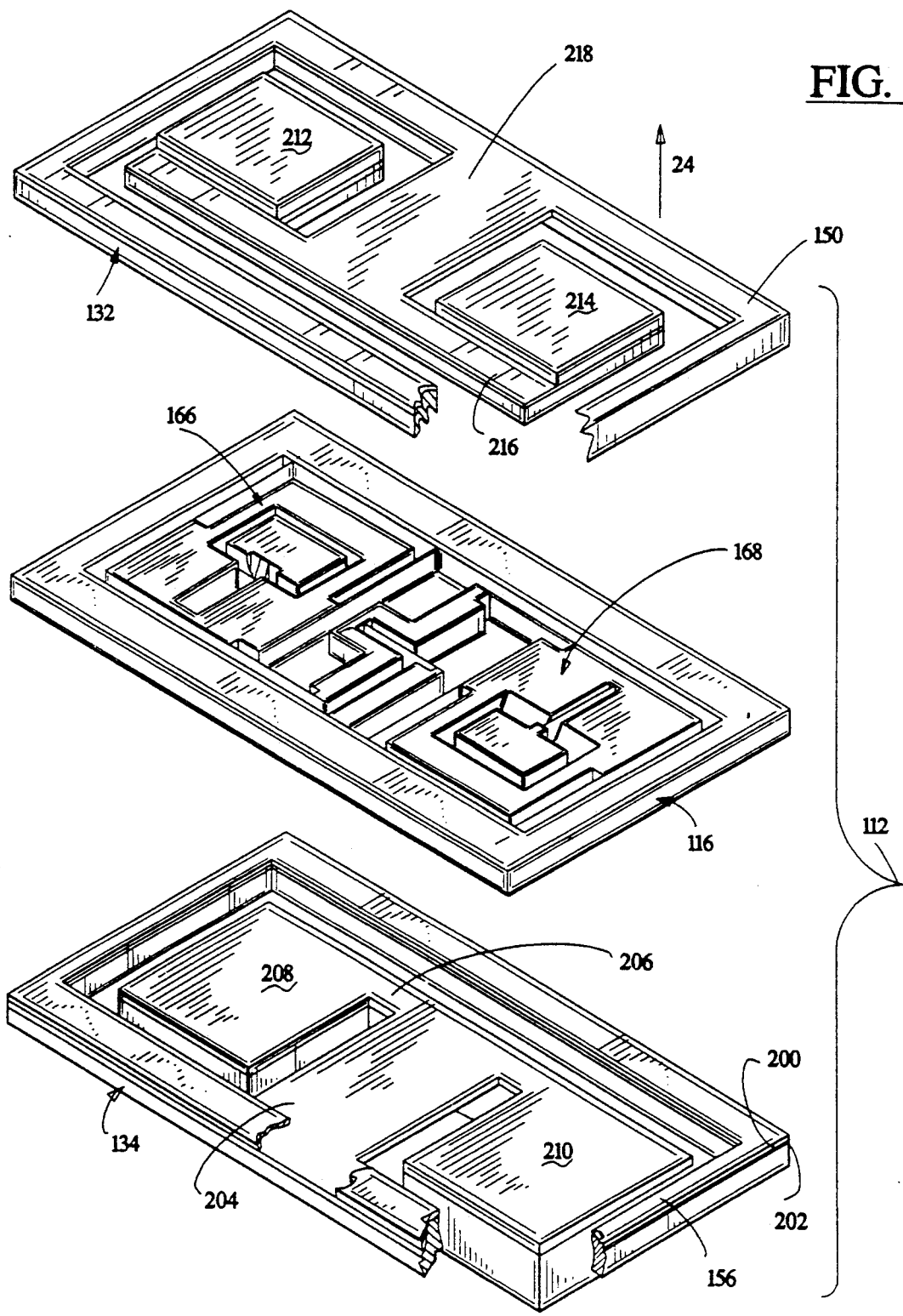
FIG. 4 is an exploded view of an arresting plate in accordance with a second embodiment of the present invention.

Turning now to FIG. 4, there is shown an acceleration overload protection mechanism according to a second embodiment of the present invention. As with the configuration previously described, the sensor device assembly 15 includes a sensor unit 25 which comprises first and second accelerometers 50 and 55. The details and operation of the sensor unit 25 are the same as the sensor unit described in conjunction with FIGS. 1–3D.

FIG. 4 also shows first and second arresting plates 160 and 165. In this embodiment, the second arresting plate 165 is etched from a single piece of doped silicon which has oppositely doped epitaxial layers 170,175. Layers 170 and 175 are shown separated by a line in FIG. 4 to show that layer 175 is etched away in the area inside the plate frame 180 except in the area forming flexure 185, connecting element 190, and arresting plates 195,200. First and second arresting elements 195 and 200 are connected by connecting element 190 while flexure 185 connects connecting element 190 to the plate frame 180.

The construction of the first arresting plate 160 is similar. As shown in FIG. 4, first arresting plate 160 includes a plate frame 205 which is coupled by a flexure arrangement to arresting elements 210 and 215. As shown, a connecting element 220 connects the arresting elements 210,215 to one another while a flexure 225 extends between the connecting element 220 and the plate frame 205. Boss elements 227 extend from the arresting elements 210,215 for connection to support frames of the IMU. Similar boss members may be disposed on the arresting elements 195,200 of the first arresting plate 160.

Figure 5:
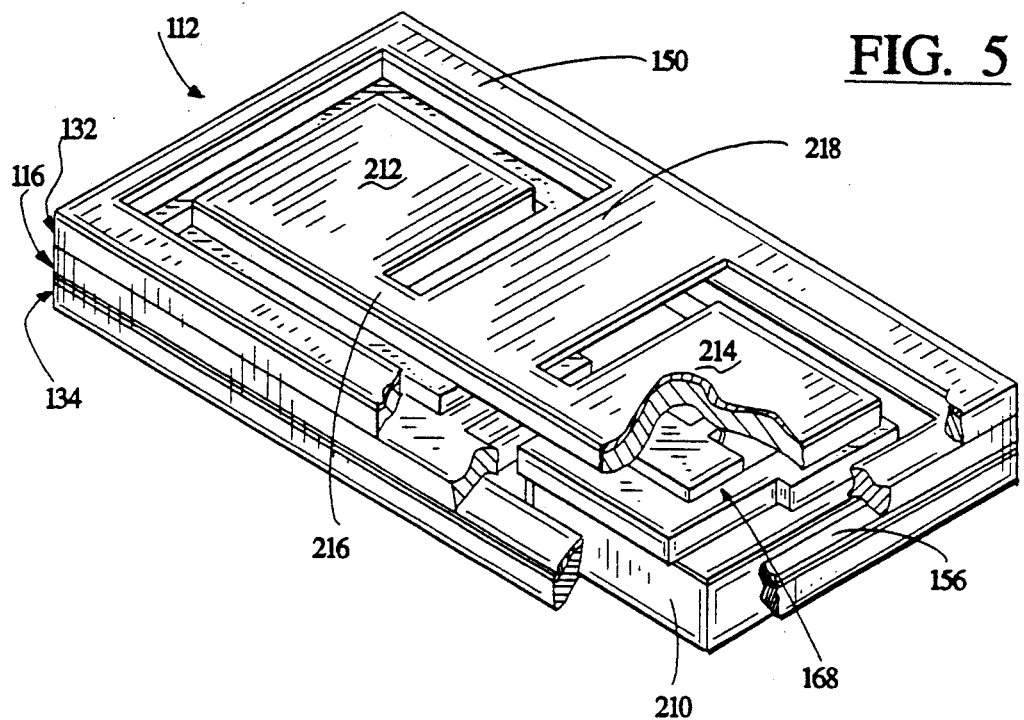
FIG. 5 is a perspective view of an arresting plate in accordance with a third embodiment of the present invention.

The flexures of the first and second arresting plates 160,165 are respectively designed so that an overload acceleration force results in a substantially linear translational motion in the directions generally denoted by the arrows 230. Accordingly, with respect to the second arresting plate 165, the flexure 185 exhibits an S-bending mode in which it bends one way at one end and the opposite way at the other end. The flexures are sufficiently compliant to permit seating of the arresting elements across the whole surface of the respective accelerometers. FIG. 5 shows the embodiment of FIG. 4 in its assembled state (boss members not shown).

Figure 6:
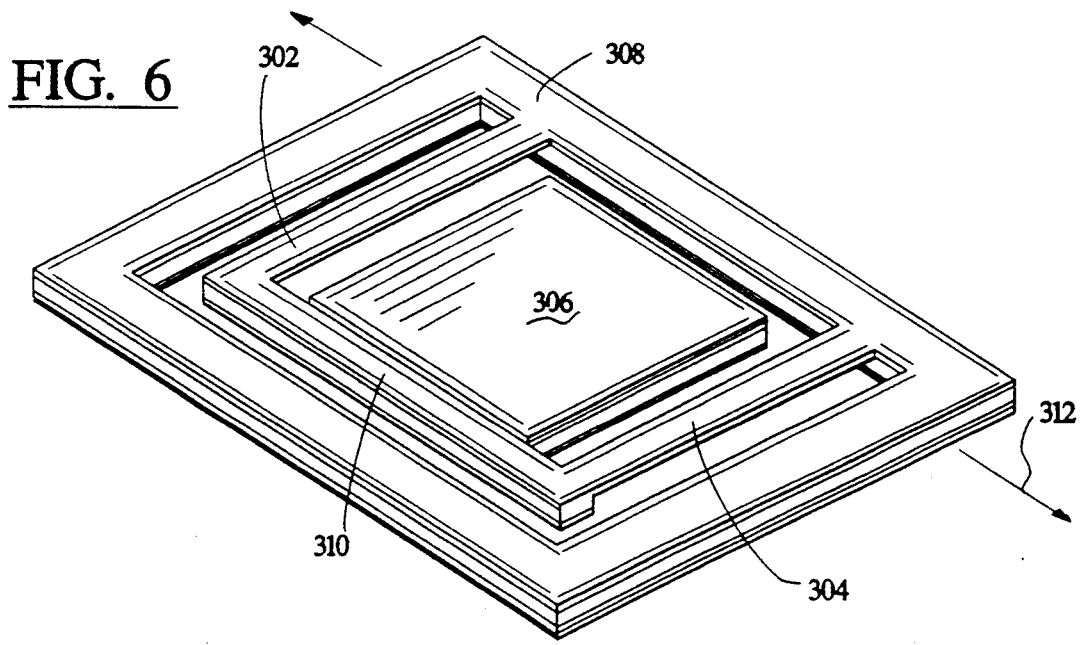
FIGS. 6-9 are perspective views of various alternate configurations of arresting plates in accordance with further embodiments of the present invention.

FIG. 6 shows a further alternative configuration to the plate configurations described above. Here, two substantially parallel and co-planar flexures 245 and 250 are employed. The flexures 245,250 extend from plate frame 255. A single arresting element 260 is connected between flexures 245,250 by a connecting element 265. Arresting element 260 is subject to substantially linear movement in the directions generally denoted by arrow 270 when an acceleration force is applied through the center of mass of the arresting element.

Figure 7:
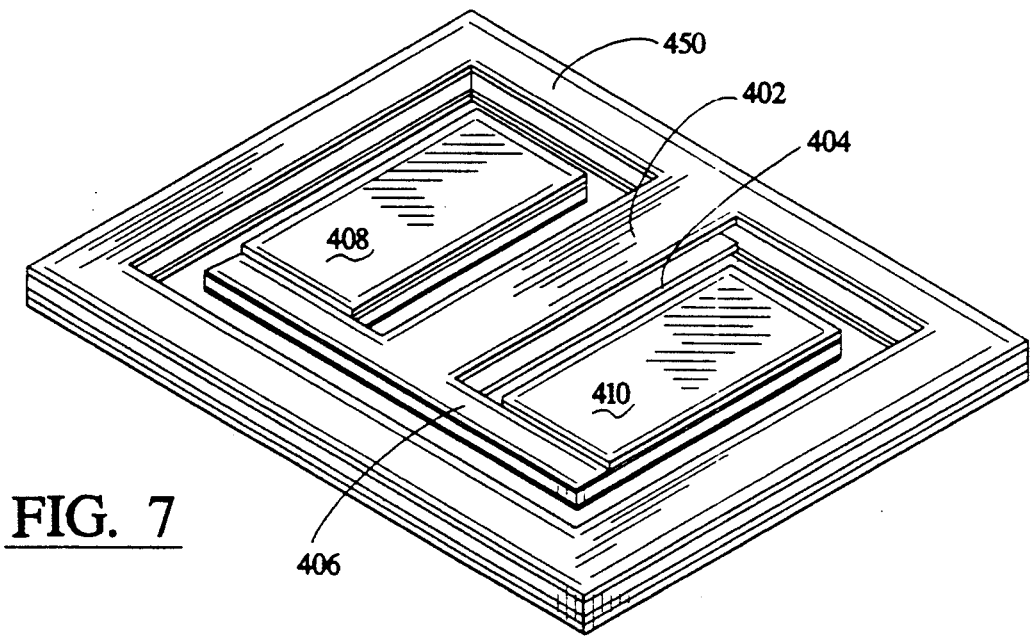
Figure 8:
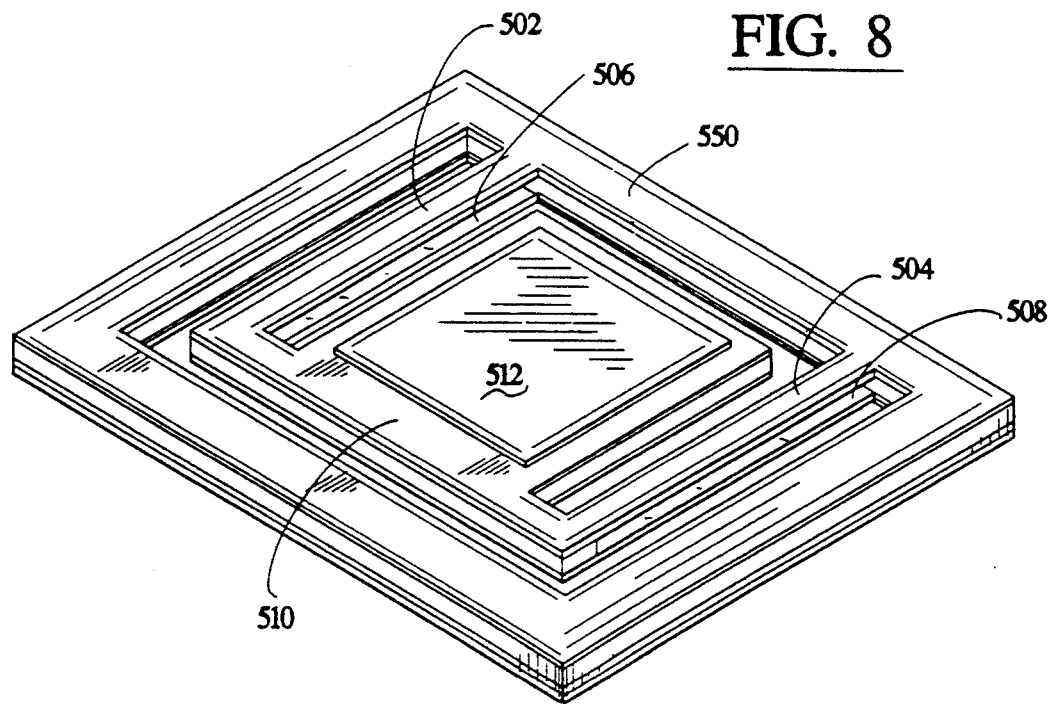
Figure 9:
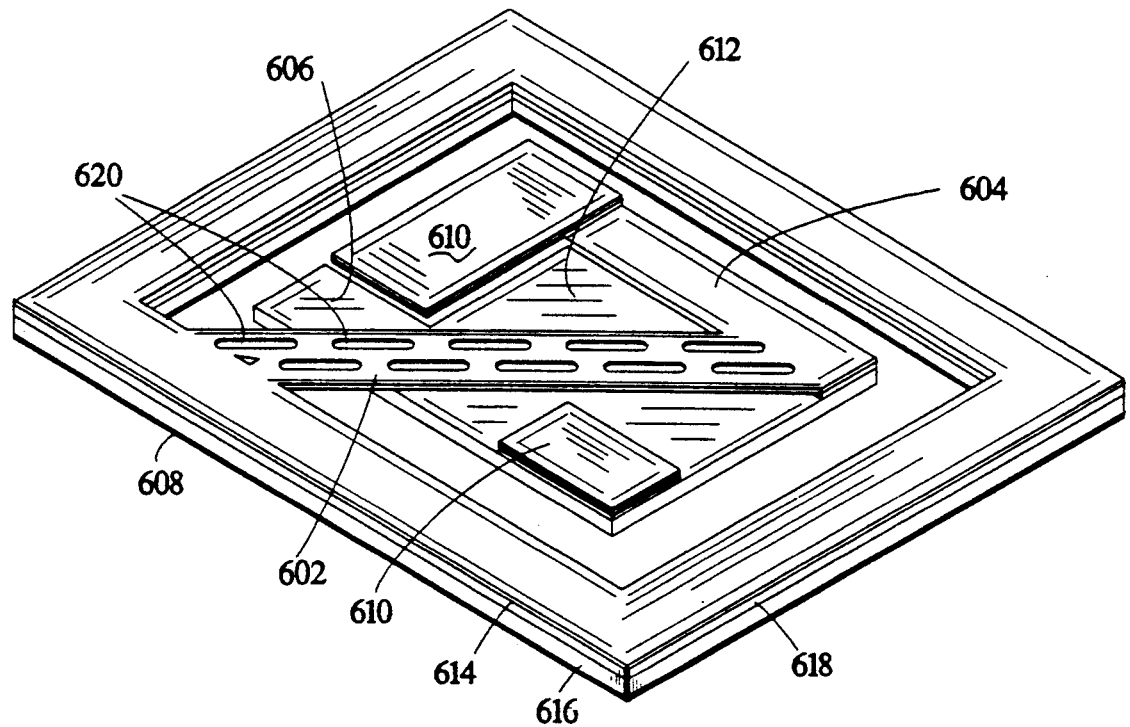

FIGS. 7-9 show further modifications of the invention illustrating different configurations of flexures for connecting the arresting plate to the plate frame. FIG. 7 shows two substantially parallel flexures 280,285 disposed in two different planes which are used to connect arresting elements 290 and 295 to frame 300 via torsion flexure 305. Similarly, FIG. 8 shows a first pair of co-planar flexures 310,315 and a second pair of co-planar flexures 320,325 connecting arresting element 330 to plate frame 335 via connecting member 340.

FIG. 9 shows an even further embodiment of the arresting plate wherein connecting flexures 336 and 337 cross over the arresting element 338 to connect the arresting element to the plate frame 339. Extension 341 and extension 350 are provided for mass balancing of the arresting element 338.

In a preferred method of manufacture of the arresting plate shown in FIG. 9, the plate is etched from a silicon wafer with faces parallel to the <100> crystal planes. Layer 370 is doped differently than the substrate 365 and layer 360. Diffusion or epitaxial growth may be used to form the layers. For example, epitaxial growth of layer 370 followed by epitaxial growth of layer 360 may be employed. Alternatively, the layers may be grown concurrently followed by a diffusion step to create the doping differential.

The doping differential facilitates selective etching of the wafer. For example, the substrate 365 and layer 360 are doped with an n-type material and layer 370 is doped with a p-type material. Layer 360 and substrate 365 are held at a positive electrical potential with respect to a KOH etchant so that they are etched at a slow rate compared to layer 370.

Various advantages flow readily from the disclosed sensor assembly and the corresponding method of operation. For example, a dramatic increase in the acceleration which ma be applied to the sensor device without damage provides for a wider range of applications. That is, where previous systems may employ arrangements which cannot survive conditions which exceed the Euler or buckling load of the various flexures in the sensor device design, the present invention can provide that same coverage, while additionally providing safety for the various sensor components during very large accelerations. Accordingly, both the structure and operation of the present invention provide significant improvements over the prior art, improvements that are manifested both in diminished risk of damage to the device.

While several embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all changes which come within the meaning and range of equivalency of the claims.

What is claimed is:

1. An acceleration overload protection mechanism for protecting a sensor unit, said sensor unit having at least one sensor element coupled to a sensor frame, said sensor element being movable with respect to said sensor frame upon the occurrence of an acceleration force along a sensitive axis of said sensor unit, said protection mechanism comprising:
   an arresting element;
   projections extending from said arresting element;
   said sensor element having channels that accept said projections to protect said sensor element from damage due to cross-axis accelerations;
   means connected to said arresting element for allowing said arresting element to move relative to said sensor element of said sensor unit to a position proximate said sensor element when said sensor unit is subject to an acceleration overload thereby causing said arresting element to limit the range of movement of said sensor element.

2. An acceleration overload protection mechanism as claimed in claim 1, wherein said means for allowing said arresting element to move relative to said sensor element comprises at least one flexure connecting said arresting element to a plate frame, said plate frame being in substantially fixed alignment with said sensor frame.

3. An acceleration overload protection mechanism as claimed in claim 1, wherein said means for allowing said arresting element to move relative to said sensor unit comprises:
   a frame bounding said arresting element having an outer periphery distal said arresting element and an inner periphery proximate said arresting element, said arresting element disposed inside said inner periphery of said frame and having an outer periphery proximate said inner periphery of said frame; and
   an elastic diaphragm extending about the outer periphery of said arresting element and connecting said arresting element to the inner periphery of said frame.

4. An acceleration overload protection mechanism as claimed in claim 1 and further comprising at least one separation pad connected to said arresting element.

5. An acceleration overload protection mechanism as claimed in claim 1 and further comprising at least one separation pad connected to said sensor element.

6. A sensor device assembly comprising:
   a sensor unit having a sensor frame and sensor elements connected to said sensor frame, at least one of said sensor elements being a movable sensor element that is movable with respect to said sensor frame upon the occurrence of an acceleration force along a sensitive axis of said sensor unit; and
   an arresting plate having a plate frame in substantially fixed alignment with said sensor frame, an arresting element, and connecting means for elastically connecting said plate frame to said arresting element to allow said arresting element to move relative to said sensor elements to a position proximate said movable sensor element of said sensor unit when said sensor unit is subject to an acceleration overload in a first direction thereby causing said arresting element to limit the range of movement of said movable sensor element, said arresting element having projections extending therefrom, at least one of said sensor elements having channels disposed therein that accept said projections to protect said sensor elements from damage due to cross-axis accelerations.

7. A sensor device assembly as claimed in claim 6 wherein said plate frame includes an outer periphery distal said arresting element and an inner periphery proximate said arresting element, said arresting element disposed inside said inner periphery of said frame and having an outer periphery proximate said inner periphery of said frame, said connecting means comprising an elastic diaphragm extending about the outer periphery of said arresting element and connecting said arresting element to the inner periphery of said plate frame.

8. A sensor device assembly as claimed in claim 6 wherein said sensor elements of said sensor unit form at least one accelerometer.

9. A sensor device assembly as claimed in claim 6 wherein said sensor unit is formed as a substantially planar structure having first and second substantially parallel sides, said arresting plate being disposed on said first side.

10. A sensor device assembly as claimed in claim 9 and further comprising a second arresting plate disposed on said second side, said second arresting plate having a plate frame connected to said sensor frame, an arresting element, and connecting means for elastically connecting said plate frame to said arresting element to allow said arresting element to move to a position proximate said movable sensor element of said sensor unit thereby to limit the range of movement of said movable sensor element when said sensor unit is subject to an acceleration overload in a second direction opposite to said first direction.

11. A sensor device assembly as claimed in claim 6 wherein said sensor elements of said sensor unit form a plurality of co-planar accelerometers.

12. As sensor device assembly as claimed in claim 6 and further comprising at least one separation pad connected to said arresting element.

13. A sensor device assembly as claimed in claim 6 and further comprising at least one separation pad connected to at least one of said sensor elements.

14. An acceleration overload protection mechanism for protecting a sensor unit, said sensor unit having at least one sensor element coupled to a sensor frame, said sensor element being movable with respect to said sensor frame upon the occurrence of an acceleration force along a sensitive axis of said sensor unit, said protection mechanism comprising;
projections extending from said sensor element;
an arresting element having channels disposed therein that accept said projections to protect said sensor element from damage due to cross-axis accelerations;
means connected to said arresting element for allowing said arresting element to move relative to said sensor element of said sensor unit to a position proximate said sensor element when said sensor unit is subject to an acceleration overload thereby causing said arresting element to limit the range of movement of said sensor element.

15. An acceleration overload protection mechanism as claimed in claim 14, wherein said means for allowing said arresting element to move relative to said sensor element comprises at least one flexure connecting said arresting element to a plate frame, said plate frame being in substantially fixed alignment with said sensor frame.

16. An acceleration overload protection mechanism as claimed in claim 14, wherein said means for allowing said arresting element to move relative to said sensor unit comprises:
a frame having an outer periphery distal said arresting element and an inner periphery proximate said arresting element, said arresting element disposed inside said inner periphery of said frame and having an outer periphery proximate said inner periphery of said frame; and
an elastic diaphragm extending about the outer periphery of said arresting element and connecting said arresting element to the inner periphery of said frame.

17. An acceleration overload protection mechanism as claimed in claim 14 and further comprising at least one separation pad connected to said arresting element.

18. An acceleration overload protection mechanism as claimed din claim 14 and further comprising at least one separation pad connected to said sensor element.

19. A sensor device assembly comprising:
a sensor unit having a sensor frame and sensor elements connected to said sensor frame, at least one said sensor elements being a movable sensor element that is movable with respect to said sensor frame upon the occurrence of an acceleration force along a sensitive axis of said sensor unit; and
an arresting plate having a plate frame in substantially fixed alignment with said sensor frame, an arresting element, and connecting means for elastically connecting said plate frame to said arresting element to allow said arresting element to move relative to said sensor elements to a position proximate said movable sensor element when said sensor unit is subject to an acceleration overload in a first direction thereby causing said arresting element to limit the range of movement of said movable sensor element, at least one of said sensor elements having projections extending therefrom, said arresting element having channels disposed therein that accept said projections to protect said sensor elements from damage due to cross-axis accelerations.

20. A sensor device assembly as claimed in claim 19 wherein said plate frame includes an outer periphery distal said arresting element and an inner periphery proximate said arresting element, said arresting element disposed inside said inner periphery of said frame and having an outer periphery proximate said inner periphery of said frame, said connecting means comprising an elastic diaphragm extending about the outer periphery of said arresting element and connecting said arresting element to the inner periphery of said plate frame.

21. A sensor device assembly as claimed in claim 19 wherein said sensor elements of said sensor unit form at least one accelerometer.

22. A sensor device assembly as claimed in claim 19 wherein said sensor unit is formed as a substantially planar structure having first and second substantially parallel sides, said arresting plate being disposed on said first side.

23. A sensor device assembly as claimed in claim 22 and further comprising a second arresting plate disposed on said second side, said second arresting plate having a plate frame connected to said sensor frame, an arresting element, and connecting means for elastically connecting said plate frame to said arresting element to allow said arresting element to move to a position proximate said movable sensor element of said sensor unit thereby to limit the range of movement of said movable sensor element when said sensor unit is subject to an acceleration overload in a second direction opposite to said first direction.

24. A sensor device assembly as claimed in claim 19 wherein said sensor elements of said sensor unit form a plurality of co-planar accelerometers.

25. A sensor device assembly as claimed in claim 19 and further comprising at least one separation pad connected to said arresting element.

26. A sensor device assembly as claimed in claim 19 and further comprising at least one separation pad connected to at least one of said sensor elements.

27. A sensor device comprising;
a first accelerometer having an accelerometer frame, a proof mass, and at least one flexure connecting said proof mass to said accelerometer frame so that said proof mass is movable with respect to said accelerometer frame along a sensitive axis;
a second accelerometer having an accelerometer frame, a proof mass, and at least one flexure connecting said proof mass to said accelerometer frame so that said proof mass is movable with respect to said accelerometer frame along said sensitive axis;
a sensor frame bounding said first and second accelerometers, said accelerometer frame of said first accelerometer and said accelerometer frame of said second accelerometer each being connected to said sensor frame by at least one flexure;
an arresting plate having a plate frame connected in a substantially fixed relationship with said sensor frame, an arresting element, and connecting means for elastically connecting said plate frame to said arresting element to allow said arresting element to move to a position proximate said first and second accelerometers to limit the range of motion of at least said proof masses of said first and second accelerometers when said first and second accelerometers are subject to an acceleration overload in a first direction, said arresting element having projections, at least one of said accelerometers having channels adapted to accept said projections to protect said at least one accelerometer from damage due to cross-axis accelerations.

28. A sensor device as claimed in claim 27 wherein said first and second accelerometers and said sensor frame are formed as a substantially planar structure having first and second substantially parallel sides, said arresting plate being disposed on said first side.

29. A sensor device assembly as claimed in claim 28 and further comprising a further arresting plate disposed on said second side for protecting said first and second accelerometers from an acceleration overload in a second direction opposite to said first direction.

30. A sensor device assembly as claimed in claim 27 and further comprising at least one separation pad connected to each of said first and second accelerometers.

31. A sensor device assembly as claimed in claim 30 and further comprising at least one separation pad connected to said arresting element of said arresting plate.

32. A sensor device comprising;
a first accelerometer having an accelerometer frame, a proof mass, and at least one flexure connecting said proof mass to said accelerometer frame so that said proof mass is movable with respect to said accelerometer frame along a sensitive axis;
a second accelerometer having an accelerometer frame, a proof mass, and at least one flexure connecting said proof mass to said accelerometer frame so that said proof mass is movable with respect to said accelerometer frame along said sensitive axis;
a sensor frame bounding said first and second accelerometers, said accelerometer frame of said first accelerometer and said accelerometer frame of said second accelerometer each being connected to said sensor frame by at least one flexure;
an arresting plate having a plate frame connected in a substantially fixed relationship with said sensor frame, an arresting element, and connecting means for elastically connecting said plate frame to said arresting element to allow said arresting element to move to a position proximate said first and second accelerometers to limit the range of motion of a least said proof masses of said first and second accelerometers when said first and second accelerometers are subject to an acceleration overload in a first direction, at least one of said first and second accelerometer having projections, said arresting element having channels that accept said projections to protect said at least one accelerometer from damage due to cross-axis accelerations.

33. A sensor device as claimed in claim 32 wherein said first and second accelerometers and said sensor frame are formed in a substantially planar structure having first and second substantially parallel sides, said arresting plate being disposed on said first side.

34. A sensor device as claimed in claim 32 and further comprising a further arresting plate disposed on said second side for protecting said first and second accelerometers from an acceleration overload in a second direction opposite to said first direction.

35. A sensor device as claimed in claim 32 and further comprising at least one separation pad connected to each of said first and second accelerometers.

36. A sensor device as claimed in claim 32 and further comprising at least one separation pad connected to said arresting element of said arresting plate.

* * * * *